United States Patent
Willer (12)

(10) Patent No.: US 6,473,495 B1
(45) Date of Patent: Oct. 29, 2002

(54) APPARATUS AND METHOD FOR COUPLING ANALOG SUBSCRIBER LINES CONNECTED TO A PRIVATE BRANCH EXCHANGE FOR TRANSMISSION OF NETWORK DATA SIGNALS IN A HOME NETWORK

(75) Inventor: Bernd Willer, Moosburg (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/302,294

(22) Filed: Apr. 30, 1999

Related U.S. Application Data

(60) Provisional application No. 60/129,355, filed on Apr. 15, 1999.

(51) Int. Cl.$^7$ .............................................. H04M 11/00
(52) U.S. Cl. .................. 379/90.01; 379/93.05
(58) Field of Search ........................... 379/93.05, 93.06, 379/93.08, 93.09, 93.01, 93.28, 93.31, 90.01

(56) References Cited

U.S. PATENT DOCUMENTS

| | | | |
|---|---|---|---|
| 4,785,448 A | * 11/1988 | Reichert et al. ............... 379/94 |
| 4,918,688 A | * 4/1990 | Krause et al. ................. 370/76 |
| 5,841,841 A | * 11/1998 | Dodds et al. ............. 379/93.08 |
| 6,115,466 A | * 9/2000 | Bella ........................... 379/399 |
| 6,243,446 B1 | * 6/2001 | Goodman ................. 379/93.01 |

FOREIGN PATENT DOCUMENTS

| WO | WO 98/02985 | 1/1998 |
|---|---|---|

\* cited by examiner

Primary Examiner—Stella Woo
(74) Attorney, Agent, or Firm—Leon R. Turkevich

(57) ABSTRACT

A home network environment is implemented in a customer premises having a Private Branch Exchange (PBX) for outputting analog telephone signals onto twisted pair wiring arranged in a star topology, by adding a high pass filter in parallel along the twisted pair wiring. The high pass filter enables transmission of network data signals between the telephone line pairs connected to the PBX, without interference of the switching operations by the PBX of analog telephone signals. The high pass filter may be implemented within the PBX as an improved PBX system that accommodates home networking, or alternatively the high pass filter may be added externally to the PBX system as a retrofit operation for existing customer premises.

18 Claims, 2 Drawing Sheets

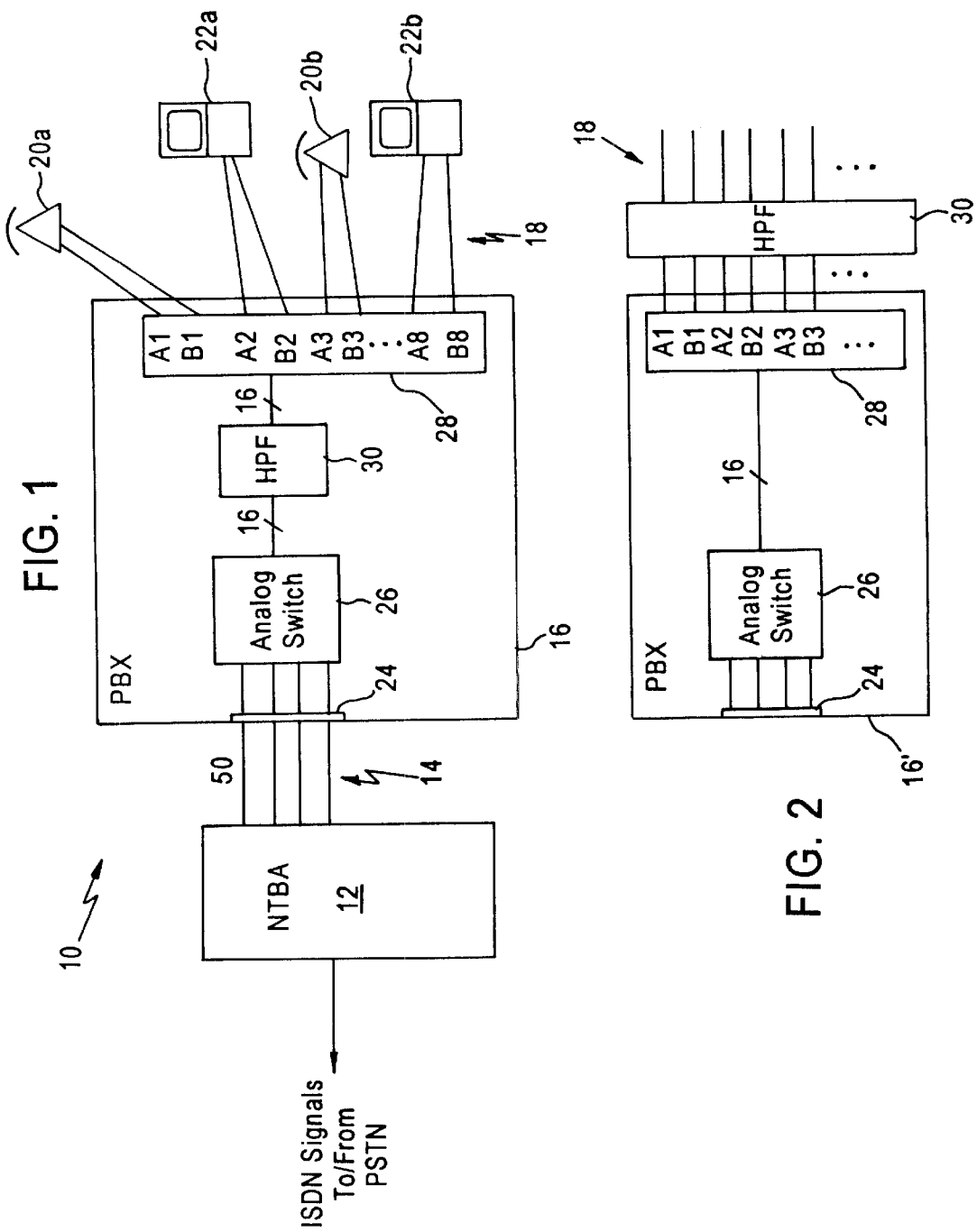

APPARATUS AND METHOD FOR COUPLING ANALOG SUBSCRIBER LINES CONNECTED TO A PRIVATE BRANCH EXCHANGE FOR TRANSMISSION OF NETWORK DATA SIGNALS IN A HOME NETWORK

CROSS-REFERENCE TO RELATED APPLICATION

This application claims priority from Provisional Application No. 60/129,355, filed Apr. 15, 1999 entitled "Frequency-Sensitive Impedance Blocking and Coupling Arrangements for a Home Network System".

FIELD OF THE INVENTION

The present invention relates to network interfacing, and more particularly, to methods and systems for controlling transmission of data between network stations connected to a telephone line medium.

Description of the Related Art

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

An additional problem encountered in European telephone systems involves the use of a Network Termination Basic Access (NTBA) device, used as an interface between the residential customer premises and Integrated Services Digital Network (ISDN)-based signals sent and received by a central office of the public switched telephone network. In particular, European-based telephone systems typically use a private branch exchange (PBX), coupled to the customer premises end of the NTBA device, to interconnect a plurality of analog telephone devices via respective twisted pair telephone wire for transmission of analog telephone signals carrying connection voice information. Hence, analog telephones within a customer premises will be wired in a star-type configuration by the private branch exchange. However, the telephone switch within the PBX is designed for transfer of analog telephone signals below 4 kHz, preventing the transfer of network data signals at the higher frequencies associated with one megabit per second or ten megabit per second data transmission rates.

SUMMARY OF THE INVENTION

There is a need for an arrangement for interconnecting computer end stations in a home telephone network where each telephone line pair is connected to a private branch exchange for communication of analog telephone signals.

There is also a need for an arrangement for implementing home computer networks in European-based systems using private branch exchanges for residential telephony services, with minimal modification to the existing customer premises. There is also a need for an arrangement that enables implementation of a home network for transmission of network data signals in customer premises having star-organized PBX systems.

These and other needs are obtained by the present invention, where a high-pass filter is connected between the telephone line pairs connected to the private branch exchange, enabling transmission of network data signals between the telephone line pairs for respective connected end stations.

According to one aspect of the present invention, a method is provided of interconnecting first and second computer end stations, connected to respective first and second telephone line pairs in a home telephone network wherein each of the telephone line pairs has a corresponding analog port connection to a private branch exchange (PBX), the PBX configured for communication of analog telephone signals on at least one of the first and second telephone line pairs. The method includes connecting a high pass filter between the first and second telephone line pairs, and transmitting network data signals, having frequencies substantially higher than the analog telephone signals, between the first and second computer end stations via the high pass filter. Hence, the high pass filter enables the network data signals to bypass the PBX circuitry, without interfering with the analog telephone signals.

According to another aspect of the present invention, a computer network includes first and second end stations, first and second twisted pair telephone wiring having first ends coupled to the first and second end stations, respectively, a private branch exchange coupling second ends of the first and second twisted pair telephone wiring and configured for communication of analog telephone signals on at least one of the first and second twisted pair telephone wiring, and a high pass circuit. The high pass circuit is coupled between the first and second twisted pair telephone wiring, for transmission of network data signals, having frequencies substantially higher than the analog telephone signals, between the first and second end stations.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION FO THE DRAWINGS

Reference is made to the attached drawings, wherein elements having the same reference numeral designations represent like elements throughout and wherein:

FIG. 1 is a block diagram illustrating a computer network implemented in a customer premises having a private branch exchange (PBX) according to an embodiment of the present invention.

FIG. 2 is a diagram illustrating a variation of the network of FIG. 1, wherein the high pass circuit is coupled to the twisted pair telephone wiring external to the PBX.

BEST MODE FOR CARRYING OUT THE INVENTION

Figure 3:
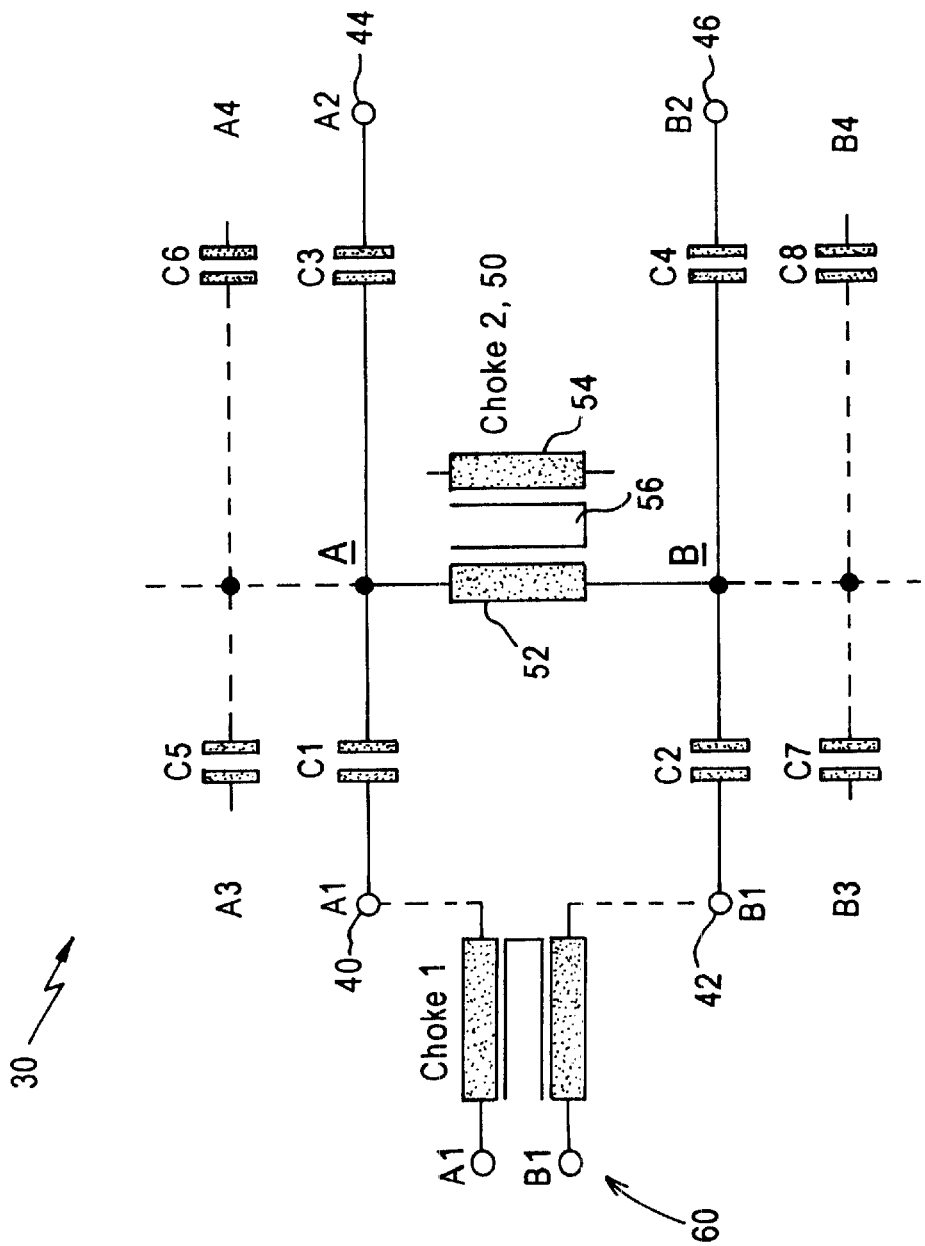
FIG. 3 is a block diagram illustrating in detail the high pass filter of FIGS. 1 and 2 according to an embodiment of the present invention.

FIG. 1 is a diagram of an Ethernet (IEEE 802.3) local area network 10 implemented in a home environment using twisted pair network media according to an embodiment of the present invention. As shown in FIG. 1, the home environment includes a network termination basic access (NTBA) device 12, configured for sending and receiving integrated services digital network (ISDN) signals to and from a public switch telephone network. As recognized in the art, the NTBA device 12 is configured for outputting ISDN-type telephone signals onto a 4-wire S0 bus (14) having 2 wires for a send path and 2 wires for a receive path. Typically implemented in European households, the S0 bus 14 may have a single termination, or multiple "taps" connected in parallel off the S0 bus 14. For simplicity, a single termination is shown as a private branch exchange 16.

The private branch exchange (PBX) 16 is configured for coupling the telephone signal on the S0 bus 14 to a plurality of twisted pair wiring 18, used to connect analog telephones 20 or computers via modem 22 according to a star topology.

Conventional PBX systems, such as PBX 16' of FIG. 2, include a first connection 24 for connecting the S0 bus 14 from the NTBA 12, an switch 26 and a plurality of analog port connections 28. The switch 26 is configured for switching analog telephone signals between the NTBA 12 via the S0 bus 14 and analog telephones 20 connected to the twisted pair 18. As such, the switch 26 may interconnect two telephones 20a and 20b coupled via respective twisted pairs 18, or may connect the telephones 20 to the public switched telephone network via the NTBA 12. The switch 26 supplies eight (8) pairs (A, B) of twisted wire to the connections 28. Each pair of twisted wire has a corresponding pair of connections (A, B) 28 in the PBX 16 and 16'. For example, the telephone 20a has its pair of telephone wires connected to connections A1 and B1, end station 22a has its twisted pair connected to connections A2 and B2, telephone 20b has its corresponding twisted pair connected to connections A3, B3, etc.

As described above, one limitation in the conventional PBX 16' is that the switch 26 is band limited to 4 kilohertz for the switching of analog telephone signals between the connections 28. Hence, if a user attempted to connect end stations 22a and 22b directly to the PBX 16', the switch 26 would attenuate the high-frequency home network signals generated by the end stations 22.

According to the disclosed embodiment, a high-pass filter circuit (HPF) 30 is added between the switch 26 and the connected twisted pair telephone lines 18, enabling the higher-frequency network data signals (i.e., home network signals) transmitted by the end stations 22a and 22b to bypass the switch 26. Hence, a computer network may be implemented in a customer premises having a star topology-based telephone network. In addition, the high-pass circuit 30 rejects lower-frequency signals within the analog telephone signal band, enabling the switch to be bypassed for transmission of network data signals without interfering with the normal switch operations for analog telephone signals.

As shown in FIG. 1, the PBX 16 includes a high pass circuit coupled between the switch 26 and the connections 28. As described in detail below with respect to FIG. 3, the actual connection of the high pass filter 30 in both FIGS. 1 and 2 coupled corresponding lines of each twisted pair telephone wiring to form a high pass circuit, such that each of the twisted pair wiring 18 are connected in parallel.

FIG. 2 is a diagram illustrating a variation of the embodiment of FIG. 1, where the high pass filter 30 is connected to the twisted pair media 18 external to the PBX 16'. Hence, the PBX 16 of FIG. 1 is considered an improvement over the conventional PBX system 16', whereas the arrangement of FIG. 2 is advantageous for upgrading or retrofiting existing customer premises systems that already have the conventional PBX 16' installed.

FIG. 3 is a block diagram illustrating in detail the high pass filter 30 according to an embodiment of the present invention. As shown in FIG. 3, the high pass filter 30 includes connectors 40, 42, 44, and 46 for connecting the first and second pairs 18 of telephone wire. Specifically, connections 40, 42, 44, and 46 are coupled to connectors A1, B1, A2, and B2 of connector 28, respectively. Hence, the connectors 40 and 42 establish a high pass filter across the twisted pair with corresponding to end station 20a, and the connectors 44 and 46 establish a high pass filter connection for the twisted pair wire connecting the end station 22a.

In particular, a high pass filter is formed across the connections A1 and B1 based on the capacitors C1 and C2, and the inductance element 50, shown as a choke. In particular, the choke 50 includes a first winding 52 coupled to nodes A and B. The nodes A and B of high pass filter 30 are capacitively coupled to a corresponding one of the telephone lines for each twisted pair. For example, the node A is capacitively coupled to terminal connections A1, A2, A3, . . . A8 and node B is capacitively coupled to connections B1, B2, B3 . . . B8. Hence, the first winding 52 of choke 50 provides an inductive load across all the associated twisted pair telephone wires 18, resulting in a parallel connection of the twisted pair wires 18 for transmission of network data signals at frequency substantially higher than the analog telephone signals.

As shown in FIG. 3, the choke 50 also includes a second winding 54 that is galvanically isolated from the first winding. Since the second winding 54 is inductively coupled to the first winding 52 via the core 56, the inductive coupling generates a copy of the transmitted network data signals onto the second winding 54. Hence, the terminal ends of the second winding 54 may be used for additional monitoring of the transmitted network data signals passing through the first winding 52 without adding any additional distortion to the network medium.

In some cases the capacitance between A and B terminals may be substantially high as to cause a short circuit for high frequency signals between terminals A and B. In such a case, the high pass filter circuit 30 further includes a second high-impedance device 60, labeled as choke 1, which is inserted in between the terminal ends 40 and 42 and the actual terminal connections A1 and B1 of connector 28. In this case, the high inductance device 60 compensates for the high capacitance within the switch 26, eliminating the possibility of a short circuit for the high frequency network signals.

According to the disclosed embodiment, a high pass filter is added to a PBX configured for switching analog telephone signals, enabling implementation of a parallel-type shared medium local area network in a customer premises telephone system having a start-wiring topology. Hence, home networking technologies may be implemented in residential premises using analog PBX switches with minimal modifications.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of interconnecting first and second computer end stations, connected to first and second telephone line pairs, respectively, in a home telephone network wherein each of the telephone line pairs has a corresponding analog port connection to an private branch exchange (PBX) configured for communication of analog telephone signals on at least one of the first and second telephone line pairs, the method comprising:

connecting a high pass filter between the first and second telephone line pairs; and transmitting network data signals, having frequencies substantially higher than the analog telephone signals, between the first and second computer end stations via the high pass filter.

2. The method of claim 1, wherein a plurality of said connected telephone line pairs are connected to said PBX, the method further comprising:

connecting the high pass filter in parallel between the plurality of connected telephone line pairs including the first and second telephone line pairs; and transmitting said network data signals between the plurality of connected telephone line pairs to respective computer end stations via the high pass filter.

3. The method of claim 2, further comprising adding a high inductance device between the analog port connection of the first telephone line pair and the high pass filter for compensation of a high capacitance within the PBX.

4. The method of claim 3, wherein the high inductance device is a common mode choke.

5. The method of claim 4, further comprising:

galvanically isloating a second winding on the inductor; and reading the network data signals from the second winding.

6. The method of claim 2, wherein the high pass filter includes first and second nodes, each capacitively coupled to a corresponding one of the telephone line pairs of the respective end stations, and an inductor having a first winding coupled to the first and second nodes.

7. A computer network comprising:

first and second end stations;

first and second twisted pair telephone wiring having first ends coupled to the first and second end stations, respectively;

a private branch exchange coupling second ends of the first and second twisted pair telephone wiring and configured for communication of analog telephone signals on at least one of the first and second twisted pair telephone wiring; and a high pass circuit, coupled between the first and second twisted pair telephone wiring, for transmission of network data signals, having frequencies substantially higher than the analog telephone signals, between the first and second end stations.

8. The computer network of claim 7, wherein the private branch exchange is coupled to a first 4-wire S0 bus, the private branch exchange including a second internal 4-wire S0 bus for transmission of Integrated Services Digital Network (ISDN)-based signals.

9. The computer network of claim 7, wherein the high pass circuit includes:

first and second nodes, each capacitively coupled to a corresponding one telephone line of each said twisted pair telephone wiring; and an inductor having a first winding coupled to the first and second nodes.

10. The computer network of claim 9, wherein the inductor includes a second winding, galvanically isolated from the first winding, for generating a copy of the transmitted network data signals.

11. The computer network of claim 9, wherein the high pass circuit further includes a high inductance device, coupled between the second ends of the first and second twisted pair telephone wiring, for compensation of a high capacitance within the private branch exchange.

12. The network of claim 7, wherein the high pass circuit is connected in parallel between the first and second twisted pair telephone wiring for transmission of the network data signals, bypassing the private branch exchange.

13. A private branch exchange (PBX) for use in a customer premises, the private branch exchange comprising:

a first connection for a plurality of lines output from a network termination basic access (NTBA) device, the NTBA device configured for sending and receiving ISDN-based telephone signals to and from a public switched telephone network;

a group of second connections for interconnecting twisted pair telephone lines serving one of telephones and end stations of a customer premises computer network;

an analog telephone switch configured for switching analog telephone signals between the second connections and the first connection; and a high pass circuit for transmission between the second connections of network data signals transmitted by the end stations at frequencies substantially higher than the analog telephone signals.

14. The PBX of claim 13, wherein the first connection is for a 4-wire S0 bus configured for sending and receiving digital ISDN signals.

15. The PBX of claim 13, wherein the high pass circuit includes:
   first and second nodes, each capacitively coupled to a corresponding one telephone line of each said twisted pair telephone line; and
   an inductor having a first winding coupled to the first and second nodes.

16. The PBX of claim 15, wherein the inductor includes a second winding, galvanically isolated from the first winding, for generating a copy of the transmitted network data signals, the PBX further including a test terminal for monitoring of the copy of the transmitted network data signals.

17. The PBX of claim 15, wherein the high pass circuit further includes a high inductance device, coupled between the telephone lines of each twisted pair, for compensation of a high capacitance within the private branch exchange.

18. The PBX of claim 12, wherein the high pass circuit is connected in parallel between the group of second connections, enabling the network data signals to bypass the analog telephone switch.

* * * * *